Dec. 9, 1969   M. JARNAGAN ET AL   3,482,602
HYDRAULIC COUPLER
Filed Aug. 8, 1967   2 Sheets-Sheet 2
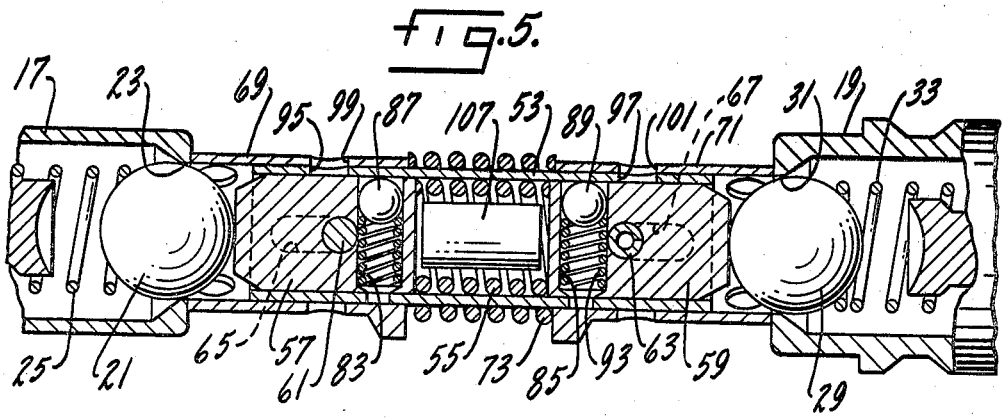
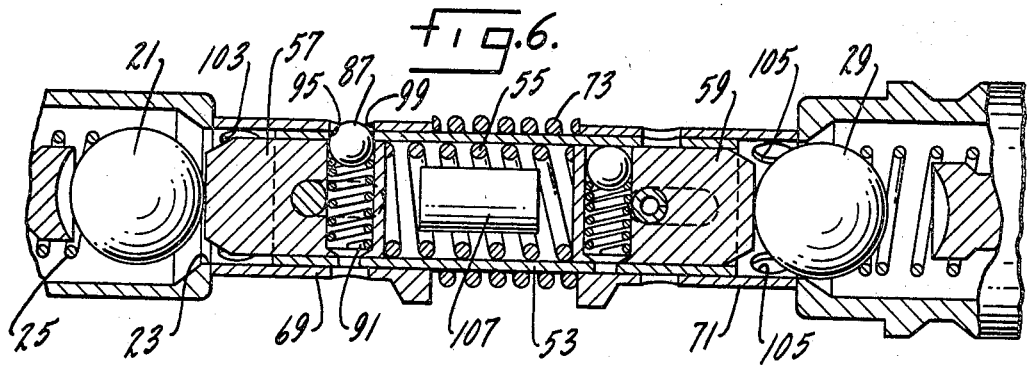
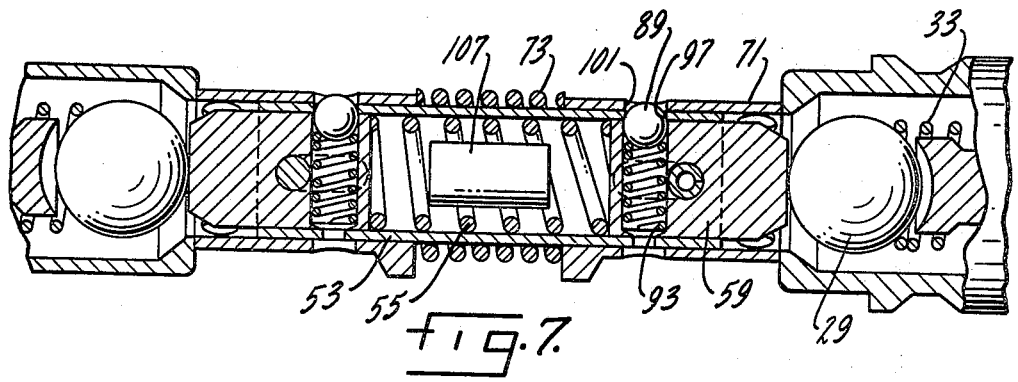
INVENTORS.
MAX JARNAGAN
HARRY L. SOSALLA
BY *Parker & Carter*
   *Attorneys.*

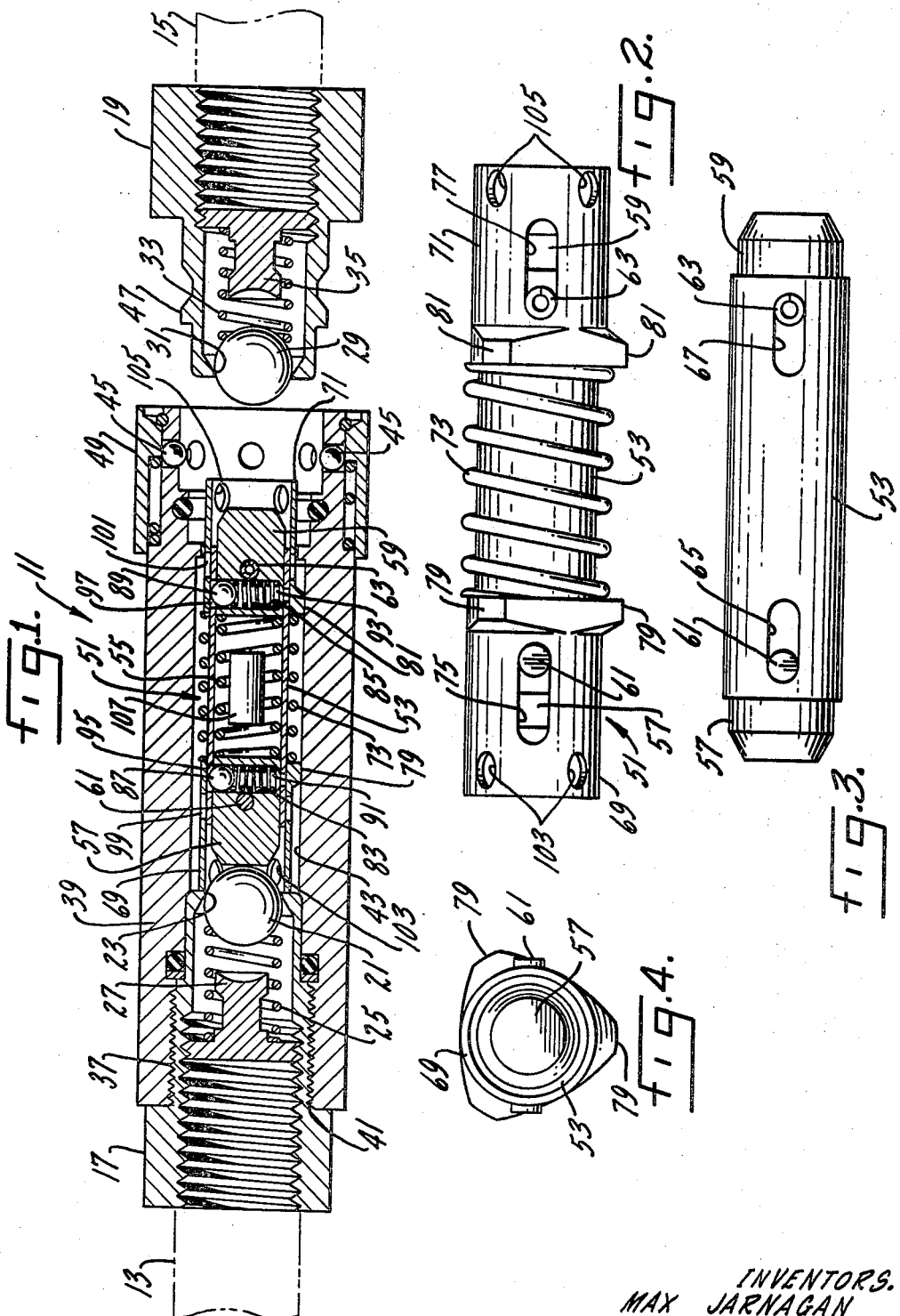

United States Patent Office 3,482,602
Patented Dec. 9, 1969

3,482,602
HYDRAULIC COUPLER
Max Jarnagan and Harry L. Sosalla, Sac City, Iowa, assignors to Noble Manufacturing Company, Sac City, Iowa, a corporation of Iowa
Filed Aug. 8, 1967, Ser. No. 659,129
Int. Cl. F16l 29/00, 37/28
U.S. Cl. 137—614.03                                    4 Claims

ABSTRACT OF THE DISCLOSURE

A coupler for releasably connecting a pair of conduits adapted to contain hydraulic fluid under pressure including a male body member connected to one of said conduits and a female body member connected to the other of said conduits, a releasable locking means for holding the body members together in telescoping relationship, a spring biased closing ball check valve as part of each body member, a spring means located in said female body member and adapted to exert unseating pressure against the ball check valves when said body members are coupled together and to hold the ball check valves open against their normal spring closing pressures, and locking means associated with the spring means to hold the ball check valves in their open positions against pressure surges in the conduits.

SUMMARY OF THE INVENTION

This invention is concerned with a coupler for releasably connecting conduits containing hydraulic fluid under pressure which coupler utilizes spring biased ball check valves to contain the fluid in the conduits and a spring means which, upon connection of the conduits, exerts unseating forces on the ball check valves that are greater than the seating forces exerted by their respective springs but less than the total seating forces exerted by the combination of their respective springs and the hydraulic fluid in their respective conduits and individual locking means to hold the ball check valves in their open positions after they are unseated by the spring means.

An object is a coupler which is operative to connect a conduit leading to a source of hydraulic fluid under pressure to an implement operated by hydraulic fluid when the implement conduit is under pressure and the other conduit is not under pressure at the time the connection is made.

Another object is a coupler which is operative to connect a conduit leading to a source of hydraulic fluid under pressure to an implement operated by hydraulic fluid when the implement conduit is not under pressure and the other conduit is under pressure at the time the connection is made.

Another object is a coupler which is operative to connect a conduit leading to a source of hydraulic fluid under pressure to an implement operated by hydraulic fluid when neither conduit is under pressure at the time the connection is made.

BRIEF DESCRIPTION OF THE DRAWINGS

The invention is illustrated more or less diagrammatically in the following drawings wherein:

FIGURE 1 is a longitudinal central section through a coupler of the invention, showing the parts of the coupler before engagement of the tubular body members;

FIGURE 2 is an enlarged side view of an element of the coupler of FIGURE 1;

FIGURE 3 is a side view of a portion of the element of FIGURE 2;

FIGURE 4 is an end view of the element of FIGURE 2;

FIGURE 5 is an enlarged view similar to FIGURE 1, with parts omitted for clarity, but showing the coupler body members in a coupled position;

FIGURE 6 is a view similar to FIGURE 5, but showing the ball check valve of one of the coupler body members in an open position; and FIGURE 7 is a view similar to FIGURE 5, but showing both ball check valves of the coupler body members in their open positions.

DESCRIPTION OF THE PREFERRED EMBODIMENT

The drawings, and especially FIGURE 1, shaw a hydraulic coupler 11 which is adapted to releasably connect a pair of conduits 13 and 15, one of which, in this instance conduit 13, is connected to a source of hydraulic fluid under pressure, as from a pump (not shown), and the other, in this instance conduit 15, is connected to an implement (not shown), which is operated by the pressurized hydraulic fluid. The coupler 11 includes a ball check valve member 17 connected to the conduit 13 and a ball check member 19 connected to the conduit 15. The ball check member 17 includes a ball 21 urged into fluid-tight contact with an annular seat 23 by a spring 25. A stop 27 limits movement of the ball 21 away from the annular seat 23. Ball check member 19 includes a ball 29 urged into fluid-tight contact with an annular seat 31 by a spring 33. A stop 35 limits movement of the ball 29 away from the annular seat 31.

External threads 37 are formed on ball check member 17. A tubular member 39 having internal threads 41 at one end thereof is adapted to be attached to the ball check member 17 by engagement of threads 37 and 41. This tubular member 39 has a bore 43 adapted to receive the ball check member 19. Detent balls 45 located at the end of the tubular member 39 opposite to the threads 41 are adapted to lock on an annular shoulder 47 formed on the ball check member 19 when the member 19 is inserted in the bore 43 of the tubular member 39. The detent balls are held in locking engagement with the annular shoulder 47 by a sliding sleeve 49.

Positioned inside the bore 43 of the tubular member 39 is a unit 51 which is adapted to exert unseating forces against the balls 21 and 29 of the check valve members 17 and 19 respectively when the check valve members are coupled together and to hold the balls off their seats to permit flow of hydraulic fluid under pressure from the conduit 13 through to the conduit 15. This unit includes a tube 53 containing a coil spring 55. Plungers 57 and 59 telescope into opposite ends of the tube 53 and engage the ends of spring 55. The plungers are held in the tube against the outward forces exerted by the spring 55 by means of pins 61 and 63 which ride in and contact the ends of slots 65 and 67 formed in the tube 53. Fitting over the ends of the tube 53 are sleeves 69 and 71 which are urged apart by a spring 73 which telescopes over the tube 53. Slots 75 and 77 formed in the sleeves 69 and 71 receive the pins 61 and 63 of the plungers 57 and 59 to limit movement of the sleeves relative to the plungers and to the tube 53. A plurality of circumferentially spaced outwardly extending projections 79 and 81 are formed at the inward ends of the sleeves 69 and 71 respectively to engage the wall of the bore 43 to align the unit 51 in the bore.

Diametrically extending holes 83 and 85 are formed respectively in the plungers 57 and 59. Balls 87 and 89 are located respectively in holes 83 and 85 and are urged outwardly of the plungers by springs 91 and 93. The balls are adapted to fit into openings 95 and 97 formed in the tube 53 and openings 99 and 101 formed respectively in the sleeves 69 and 71. A plurality of openings 103 and 105 are formed respectively in the sleeves 69 and 71 adjoining the outer ends thereof. A filler in the shape of a cylinder 107 may be placed inside of the spring 55 to reduce the amount of hydraulic fluid required to fill the bore 43.

The use, operation and function of this invention are as follows:

FIGURE 1 shows the coupler 11 before connection of the male ball check member 19 with the tubular member 39 threaded to the ball check member 17. It should be noted that upon coupling, the unit 51 located in the bore 43 will either be in or will be moved to the position shown in FIGURE 1 in which its plunger 57 is contacting the ball 21. The plungers 57 and 59 and sleeves 69 and 71 of this unit will be spaced their maximum distances from one another. The relative positions of the various parts of unit 51 are more clearly shown in FIGURE 2. The plungers are urged apart by the spring 55 (FIGURE 1) and are limited in movement away from each other by engagement of the pins 61 and 63 with the ends of the slots 65 and 67 in the tube 53 (FIGURE 3). The plungers are held against movement towards each other by the spring 55 and by engagement of the locking balls 87 and 89 with the walls of the openings 95 and 97 in the tube. Thus, the plungers are locked relative to the tube 53.

The sleeves 69 and 71 are urged apart by the spring 73 (FIGURE 2) and are limited in movement away from each other by engagement of the pins 61 and 63 with the ends of the slots 75 and 77 in the sleeves. Thus, the sleeves are free to move towards each other being restrained only by the spring 73.

Assume for purposes of explanation that the conduits 13 and 15 contain hydraulic fluid under pressure with the conduit 13 connected to the source of fluid under pressure and the conduit 15 connected to the implement to be operated by the pressurized fluid. When the male ball check valve member 19 is inserted into the tubular member 39 to the position shown in FIGURE 5, the sleeve 49 depresses the detent balls 45 into position behind the annular shoulder 47 to lock the male check valve member 19 to the tubular member 39. The functioning of this structure is conventional and is omitted for clarity. The end of check valve member 19 contacts sleeve 71 moving this sleeve towards the ball check member 17. At the same time, the ball 29 engages the plunger 59 moving this plunger towards ball check member 17.

At the time of engagement of the ball 29 and the plunger 59, the plunger 59 is locked relative to the tube 53 by the locking ball 89 which is seated in the opening 97 of the tube and held therein by the force of spring 93 (FIGURE 1). Initially, because of the engagement with locking ball 89 in the opening 97, the tube 53 will move with the plunger 59 towards the ball check member 17, but eventually the locking ball 89 will be forced out of the opening 97 and inwardly into hole 85 to thereby free the plunger 59 from locking engagement with the tube 53.

During movement of the tube 53 towards ball 21 of ball check member 17, the locking ball 87 is unseated from the opening 95 in tube 53 and is moved downwardly into the hole 83 in plunger 57 thereby freeing plunger 57 from locking engagement with the tube 53. It should be noted that when the ball check member 19 is fully seated in the tubular member 39 (FIGURE 5), the tube 53 is positioned to the left of its position of FIGURE 1 so that the openings 95 in the tube and 99 in the sleeve 69 will be aligned as will be the openings 97 in the tube and 101 in the sleeve 71. The alignment of these openings is brought about by engagement of the pin 63 with the inward end of slot 67 in tube 53. When this pin engages the end of the slot 67 during inward movement of the plunger 59, it moves tube 53 to the left to align opening 95 therein with opening 99 in sleeve 69. Movement of tube 53 to the left of the alignment position of openings 95 and 99 is prevented by engagement of pin 61 with the inward end of slot 65 in tube 53.

The plungers 57 and 59, because unlocked, will be free to move relative to the tube 53 but will be held in the position shown in FIGURE 5 by the opposite forces exerted against them by the balls 21 and 29 and the spring 55. The spring 55 has been compressed. The balls 21 and 29 will remain closed against their respective seats 23 and 31 as long as the forces urging them against their seats due to the combination of the forces exerted by hydraulic pressure in their conduits and the forces exerted by their springs 25 and 33 are greater than the forces exerted by the compressed spring 55.

FIGURE 6 shows the positions taken by the elements of unit 51 when hydraulic pressure is momentarily reduced in conduit 13 thereby allowing the plunger 57 and spring 55 to force the ball 21 off seat 23 and against spring 25. As the plunger 57 moves to the left to unseat ball 21, its locking ball 87 is moved into alignment with the aligned openings 95 and 99 in the tube 53 and sleeve 69. The spring 91 forces the ball 87 outwardly into locking engagement with the tube and the sleeve. When the hydraulic pressure in conduit 13 is increased to normal, the hydraulic fluid will fill bore 43 (not shown in FIGURE 6) and will exert equal pressure on both sides of ball 21. The ball 21 will remain in the open position because the pressure exerted by spring 55 is greater than the pressure exerted by spring 25. With the ball 87 engaging the walls of the openings in both the tube and the sleeve, the plunger 57 and ball 21 cannot be moved by surges in the hydraulic fluid in the conduit 13 and bore 43. With the ball 21 unseated, the fluid passes through openings 103 in sleeve 69 and into the bore 43 and then through the openings 105 in the sleeve 71 to act against the ball check 29.

FIGURE 7 shows the positions of the elements of unit 51 after buildup of hydraulic fluid in the bore 43 (not shown in FIGURE 7). When the combination of the force exerted by the hydraulic fluid acting against ball 29 and the force exerted by spring 55 through plunger 59 is greater than the force exerted by the hydraulic fluid in conduit 15 and the spring 33, the ball 29 is unseated and moved to the right as viewed in the drawings. When the plunger 59 moves to the right, its locking ball 89 becomes aligned with the opening 97 in the tube 53 and the opening 101 in the sleeve 71. The ball 89 seats in these openings under urging of the spring 93 to lock the plunger 59 and ball 29 in the open position. With the plunger thus locked, it will prevent the ball 29 from closing because of presusre surges of the hydraulic fluid.

The ball check member 19 may be uncoupled from the tubular member 39 without substantial loss of hydraulic fluid by sliding the sleeve 49 to the left to release the detent balls 45 and then withdrawing the member 19 to the right as shown in the drawings. The removal of the check valve member 19 from the bore 43 of the tubular member 39 will permit the spring 73 to force the sleeve 71 to the right moving the locking ball 89 out of the opening 101 in this sleeve and thereby freeing the sleeve to move to the right. The forces exerted against ball 21 by the hydraulic pressure in conduit 13 and by spring 25 will urge the plunger 57 to the right thereby unseating the locking ball 87 from the opening 99 in the sleeve 69 to thereby free the plunger 57 from the sleeve 69 to be moved to the right. Upon movement of the plunger 57 to the right, the ball 21 moves to close against seat 23 thus cutting off the flow of hydraulic fluid out of the conduit 13. The plungers 57 and 59 will remain locked to the tube 53 through means of the locking balls 87 and 89 which will remain seated in the respective openings 95 and 97 in the tube 53 as the tube and plungers move to the position shown in FIGURE 1.

One of the advantages of this invention resides in the provision of a separate locking means for each plunger in the unit 51. The separate locking means for each plunger permits either ball 21 or 29 to remain seated or to be locked open independently of the other ball check. This advantage is illustrated in FIGURE 6, where the plunger 57 is shown locked in a position holding the ball 21 off its seat 23 while the plunger 59 is shown in an unlocked position contacting the ball check 29. The use of separate locking means for each plunger permits the connection of conduits when either one or both are not pressurized. For example, if conduit 13 were not pressurized at the time the connection was made, but conduit 15 was, the elements of unit 51 would take the positions shown in FIGURE 6. In such a situation, the plunger 57 would be moved to the left as the coupling was made forcing the ball 21 off of the seat 23 with the plunger moving to the position in which its locking ball 87 engages the walls of the openings 95 and 99 respectively located in the tube 53 and sleeve 69. The elements would remain in the position shown in FIGURE 6 until the pressure built up in the conduit 13 becomes sufficient to fill the bore 43 and unseat the ball 29.

If the conduit 13 is pressurized at the time of coupling of the body members 17 and 19, but the conduit 15 is not under pressure, the unit 51 permits the coupling to be made with the plunger 59 assuming the position shown in FIGURE 7 and the plunger 57 assuming the position shown in FIGURE 5. Under such circumstances, therefore, the plunger 59 will move the ball 29 to its unseated position and will be locked in this position by engagement of the ball 89 with the walls of the openings 97 and 101 in the tube 53 and sleeve 71. The plunger 57 will unseat the ball check 21 in the manner previously described when the pressure is momentarily relieved in the conduit 13. Thus, the provision of separate locking means for the plungers 57 and 59 permit either one of these plungers or both to be locked in the unseated position of the ball checks or to completely unlock depending on the condition of the conduits of the conduits at the time of coupling.

While a preferred form of the invention has been shown and described, it should be understood that this showing is exemplary only and that many modifications of the structure of this invention may become apparent to those skilled in the art. Therefore, the scope of this invention should be limited only by the claims attached hereto.

We claim:

1. In a coupler for releasably connecting and intercommunicating a pair of conduits, including:
   a pair of body members, one of which is connected to a conduit leading to means for supplying fluid under pressure and the other of which is connected to a conduit leading to a device to be powered by the pressurized fluid,
   means for releasably connecting said body members end to end in a telescoping relationship,
   said body members having longitudinal bores with opposed annular valve seats located in said bores and disposed in coaxially spaced relationship when said body members are connected,
   check valves in said body members each adapted to seat in fluid-tight relationship against its respective valve seat,
   resilient means positioned within said body members and urging said check valves against their respective seats, and
   spring means located in one of said body members and adapted upon connecting of said body members to exert an unseating force against each of the check valves which force is greater than the seating force exerted against each of said check valves by its resilient means but less than the sum of seating forces exerted against each of said check valves by its resilient means and by the pressurized fluid in its conduit,
   the improvement comprising:
   a pair of releasable locking means associated with said spring means with one locking means located at each end of said spring means, each of said releasable locking means being associated with a check valve and operative upon unseating of its respective check valve to restrain movement thereof to maintain its check valve unseated.

2. The structure of claim 1 further characterized in that said spring means includes a coil spring having a plunger at each end thereof with said coil spring and plungers located in a tube, said tube having a sleeve telescoped over each end thereof, a second coil spring surrounding said tube and engaging said sleeves to urge said sleeves apart, said sleeves and tube having openings formed therein,
   said locking means including a spring biased ball carried by each plunger, said spring biased balls adapted to fit into said openings in engagement with said tube and said sleeves to lock said plungers relative to said tube and said sleeves.

3. A check valve unseating and hold opening device for insertion into the bore of a tubular member connected to a conduit having a first spring biased ball check valve at one end of the bore and means at the opposite end of the bore to releasably connect to a body connected to a second conduit and having a second spring biased ball check valve, said device including:
   a tube,
   a coil spring positioned inside of said tube,
   a pair of plungers, one of which is positioned in contact with each end of said coil spring for telescoping movement at least partially into and out of said tube with said spring urging said plungers out of said tube,
   stop means formed as part of said tube and said plungers to limit movement of said plungers into and out of said tube,
   a pair of sleeves, one of which is telescoped over each end of said tube,
   a second coil spring surrounding said tube and engaging said sleeves to urge said sleeves apart,
   means formed on said sleeves to engage said plungers' stop means to limit movement of said sleeves towards and away from one another,
   said tube and said sleeves having openings formed therein which are alignable with one another upon connection of said tubular member and said body, and
   a separate locking means for locking each plunger and sleeve relative to the tube and to one another,
   each said locking means including a spring biased ball carried by its plunger,
   said spring biased ball adapted to fit in said openings in said sleeve and tube to engage said tube and said sleeve to lock said plunger relative to said tube and said sleeve.

4. In a coupler for releasably connecting and intercommunicating a pair of conduits, including:
   a pair of body members, one of which is connected to a conduit leading to means for supplying fluid under pressure, and the other of which is connected to a conduit leading to a device to be powered by the pressurized fluid,
   means for releasably connecting said body members end to end in a telescoping relationship,
   said body members having longitudinal bores with opposed annular valves located in said bores and disposed in coaxially spaced relationship when said body members are connected,
   check valves in said body members each adapted to seat in fluid-tight relationship against its respective valve seat, resilient means positioned within said valve bodies and urging said check valves against their respective seats, the improvement comprising:

means located in one of said body members and adapted upon connecting of said body members to exert an unseating force against each of the check valves which force is greater than the seating force exerted against each of said check valves by its resilient means, but less than the sum of forces exerted against each of said check valves by its resilient means and by the pressurized fluid in its conduit, said means including a coil spring, a check valve engaging member located at each end of said coil spring, said coil spring and said check valve engaging members being positioned inside a tube, a pair of sleeves each of which is fitted over an end of said tube, a second coil spring surrounding said tube and engaging said sleeves to urge said sleeves apart, an outwardly biased ball carried by each of said check valves engaging members, openings in said tube and said sleeves adaptable to receive said balls in engagement with said tube and sleeves, the openings in the sleeves and tube being alignable upon coupling of said body members, and each of said locking balls of said check valves engaging members being alignable with a set of said openings to be urged into said openings and into engagement with said tube and sleeves when its respective check valve is in an unseated position.

References Cited

UNITED STATES PATENTS 3,431,942   3/1969   Kopaska _____ 251—297 XR

WILLIAM F. O'DEA, Primary Examiner

W. H. WRIGHT, Assistant Examiner

U.S. Cl. X.R.

137—614.05, 614.06, 637.05; 251—149